R. C. HILTON.
PUMP.
APPLICATION FILED APR. 27, 1920.
1,389,001.
Patented Aug. 30, 1921.
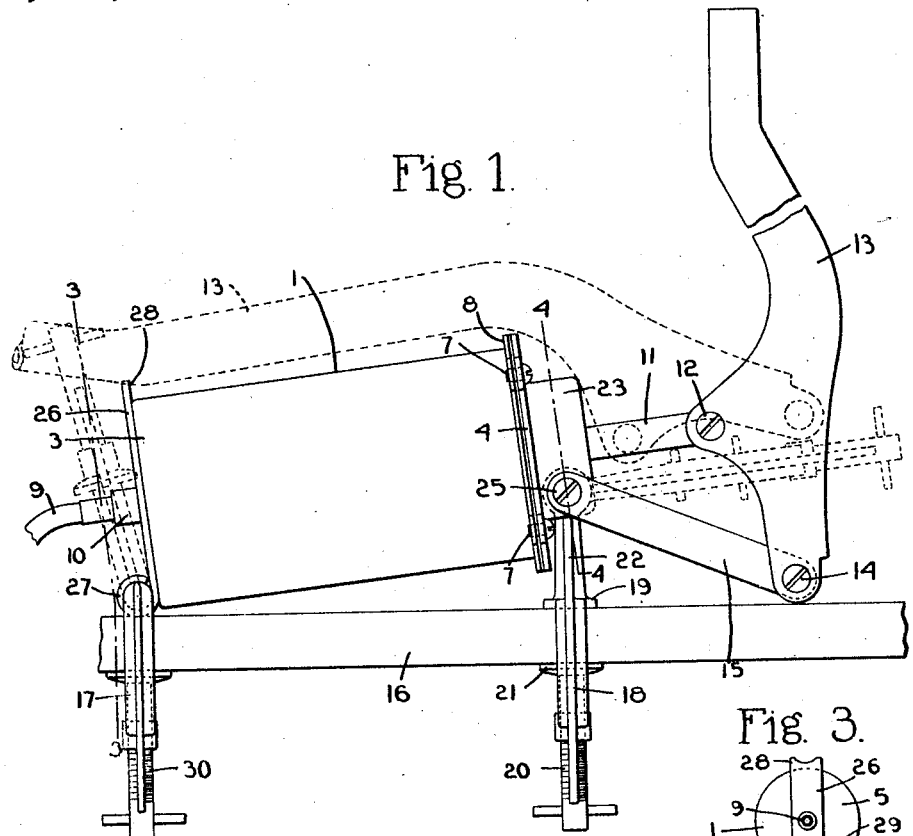
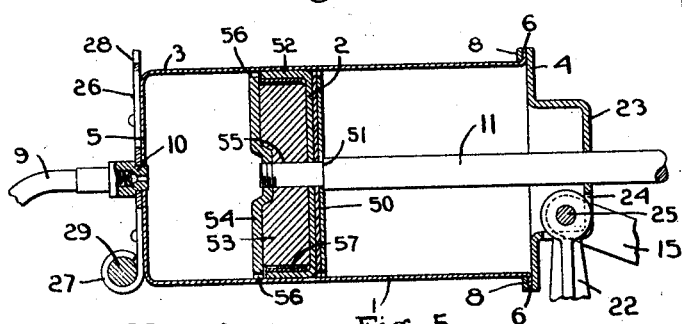
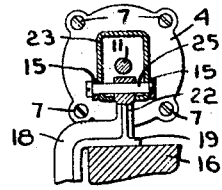
Inventor.
Roland C. Hilton
by Heard Smith & Tennant
Attys.

UNITED STATES PATENT OFFICE.

ROLAND C. HILTON, OF TROY, NEW YORK, ASSIGNOR TO REECE-HILTON, INC., OF TROY, NEW YORK, A CORPORATION OF NEW YORK.

PUMP.

1,389,001.     Specification of Letters Patent.     Patented Aug. 30, 1921.

Application filed April 27, 1920. Serial No. 376,938.

*To all whom it may concern:*

Be it known that I, ROLAND C. HILTON, a citizen of the United States, residing at Troy, county of Rensselaer, State of New York, have invented an Improvement in Pumps, of which the following description, in connection with the accompanying drawing, is a specification, like characters on the drawing representing like parts.

This invention relates to pumps for pumping up automobile tires and particularly to that type of pump which is adapted to be clamped to the running board. The object of the invention is to provide an improved pump of this type which is simple in construction and inexpensive to manufacture, and which has other features of novelty, all as will be more fully hereinafter set forth.

In order to give an understanding of my invention, I have illustrated in the drawings a selected embodiment thereof which will now be described, after which the novel features will be pointed out in the appended claims.

Figure 1 is a side view of a pump embodying my invention showing the pump clamped to the running-board;

Fig. 2 is a longitudinal section through the cylinder;

Fig. 3 is a reduced section on the line 3—3, Fig. 1;

Fig. 4 is a reduced section on the line 4—4, of Fig. 1;

Fig. 5 is a reduced transverse section through the cylinder.

1 indicates the cylinder of the pump and 2 the piston operating therein. In order to simplify the construction of the cylinder, I propose to make it of two elements 3 and 4, one of which, 3, comprises the body of the cylinder and one end, and the other of which, 4, constitutes the other end of the cylinder. The element 3 is a cup-shaped member which may be formed or pressed into shape from sheet metal and it constitutes not only the walls of the cylinder, but also the end 5 thereof. This element 3 is provided with an outwardly-directed flange 6 to which the cylinder head element 4 is secured by means of clamping screws 7. This member 4 can conveniently be made from sheet metal which is pressed into the desired shape. In order to provide a secure anchorage for the clamping screws 7, I propose to employ a collar 8 which is situated behind the flange 6 and into which the clamping screws 7 are screw-threaded. With this construction the flange 6 of the cylinder will be firmly clamped between the collar 8 and the peripheral edge of the cylinder head 4. The cylinder communicates with a delivery pipe or hose 9 through a suitable check valve 10 which may have any appropriate or usual construction.

The piston 2 is of the cupped washer variety and it is secured to a piston rod 11 which extends through the cylinder head 4. The piston structure comprises a disk 50 which rests against a shoulder 51 formed on the piston rod, a cupped washer 52, a block 53 of wood, and another disk 54 to which the reduced end 55 of the piston is screw-threaded, said disk 54 acting as a clamping nut. The disks 50 and 54 are of a size to fit the interior of the cylinder, and each is provided with notches 56 in its periphery. The wooden block 53 is somewhat smaller in diameter than the cupped washer 52 and a split spring ring 57 is interposed between the wooden block and the cupped washer, said ring acting to yieldingly hold the washer against the sides of the cylinder. The block 53 is preferably saturated with lubricant in some suitable way, and the contact which it has with the body of the cupped washer serves to keep the latter sufficiently lubricated so that it is always soft and pliable. As stated above, the disk 54 acts as a nut to hold the parts of the piston structure firmly clamped together and seated against the shoulder 54. The two disks 50 and 54 serve to properly guide the piston in its movement. During the stroke of the piston to the right, the air can pass through the notches 56 and around the cupped washer and during the stroke to the left, the washer is expanded against the cylinder walls thereby making a tight joint.

The piston rod is pivotally connected at 12 to an actuating lever 13 and the latter extends beyond the pivotal point 12 and is pivoted at 14 to a forked link 15 which in turn is pivoted to the cylinder head 4. With this construction the swinging movement of the lever 13 will operate to reciprocate the piston as will be obvious, and the movement of the piston to the right will result in air being drawn past the piston into the left-hand end of the cylinder, as above described, and during the movement of the piston to the left, this air will be forced through the check valve 10 into the tire through the pipe 9. With this single-stroke piston all the pressure which is developed during the compression stroke is in the left-hand end of the cylinder, and since the cylinder end 5 is integral with the cylinder walls, there is no possibility of any leakage occurring at this end of the cylinder which will result in loss of compression.

The pump is constructed to be clamped to the running board 16 or any other suitable support by means of two clamps 17 and 18, one at each end of the cylinder. The clamp 18 is provided with a foot or rest 19 which engages the top of the running-board, and a clamping screw 20 having a head 21 to engage the underside of the running board. This clamp is formed with an extension 22 which is pivotally connected to the cylinder head 4. I propose to make the cylinder head with the bumped portion 23 and to employ a single pivotal pin to connect the link 15 and clamp 18 thereto. The cylinder head 4 is formed with an opening 24 into which the upper end of the extension 22 of the clamp is inserted, and said extension is pivotally mounted on a pivot pin 25 which is mounted in the bumped portion 23 of the cylinder head. This pivot pin extends beyond the portion 23 and the two arms of the forked link 15 are pivotally connected on the projecting ends of said pivotal pin. Thus by using a common pivotal pin for pivotally connecting both the clamp and the link 15 to the cylinder head 4, the number of parts is reduced and the construction is simplified. The cylinder end 5 has a strap 26 secured thereto, the lower end of which is bent to form a hinge member 27 and the upper end 28 of which extends slightly above the cylinder and forms a rest for the actuating lever 13. The clamp 17 is provided with a laterally-extending arm 29 which is pivotally mounted in the hinge member 27, said clamp carrying the usual clamping screw 30 which is adapted to engage the under side of the running-board 16.

When the pump is clamped to the running board the hinge member 27 rests on the top of the running-board and constitutes the support for one end of the cylinder while the clamp 18 constitutes the support for the other end of the cylinder. The cylinder is thus positioned at a slight inclination which is an advantage in operating the pump.

The clamp 17 is constructed so that when the pump is detached from the running-board it can be folded up against the end of the cylinder, as shown in dotted lines, Fig. 1, and the clamp 18 is constructed so that when the pump is not in use it can be folded up into the dotted line position in a direction parallel to the axis of the pump after the handle has been swung down against the cylinder, as shown by dotted lines, Fig. 1. When the parts are in the dotted line position, the pump structure occupies a minimum amount of space and can be readily packed into a tool box or any other receptacle.

The rest 28 operates as a stop to engage the handle when the pump is being operated and thus prevents the handle from striking and injuring the cylinder wall. It will be observed from the above that my pump comprises very few parts, is extremely simple to manufacture and is so constructed that there is nothing to get out of order and no possibility of any leakage.

I claim:

1. In a pump, the combination with a cylinder element comprising a one-piece cup-shaped member which constitutes the side walls and one end of the cylinder, of a cylinder head secured to said member, a piston in the cylinder, a piston rod connected to said piston and extending through said cylinder head, an actuating lever pivoted intermediate of its ends to the end of the piston rod, a link pivotally connecting said cylinder head with the end of the actuating lever, and a clamping member pivoted to the cylinder head co-axially with said link and by which the cylinder is clamped to a running-board.

2. In a pump, the combination with a cylinder, of a piston therein, means for actuating the piston, a hinge member secured to one end of the cylinder and which constitutes a rest for said end of the cylinder, a clamp pivoted to said hinge member and by which said end of the cylinder is clamped to a running-board, a second clamp pivoted to the other end of the cylinder, said second clamp having a foot portion to engage the upper face of the running-board, and a clamping screw to clamp said foot to the running-board.

3. In a pump, the combination with a one-piece cup-shaped member constituting the walls and one end of the cylinder, of a cylinder head secured to the opposite end of the cylinder and provided with a bumped portion, a piston in the cylinder, a piston rod connected to the piston, a pivotal pin mounted in said bumped portion of the cylinder head, a clamp pivoted to said pin and by which the cylinder is clamped to a running-board, a link also pivoted to said pin, and an actuating lever pivoted at one end to said link and also pivotally connected to the piston rod.

4. In a pump, the combination with a one-piece cup-shaped element constituting the side walls and one end of the cylinder, a cylinder head secured to said cup-shaped member, a strap secured to the end of the cylinder and formed to present a hinge member, the end of the strap projecting above the cylinder, a clamp pivoted to said hinge member, a second clamp pivoted to the cylinder head and constructed to clamp said cylinder to the running-board and support it above the latter, a piston in the cylinder, a piston rod connected thereto, and an actuating lever connected to the piston rod, the projecting end of said strap constituting a support or stop for the lever.

In testimony whereof, I have signed my name to this specification.

ROLAND C. HILTON.